United States Patent [19]

Jacobson

[11] Patent Number: 5,004,359
[45] Date of Patent: Apr. 2, 1991

[54] ROLLER BEARING

[75] Inventor: Bo O. Jacobson, Zeist, Netherlands

[73] Assignee: SKF Industrial Trading and Development Co. B.V., Nieuwegein, Netherlands

[21] Appl. No.: 560,283

[22] Filed: Jul. 27, 1990

Related U.S. Application Data

[63] Continuation of Ser. No. 355,972, May 23, 1989, abandoned.

[30] Foreign Application Priority Data

May 31, 1988 [NL] Netherlands ............... 8801389

[51] Int. Cl.$^5$ ............................................. F16C 33/44
[52] U.S. Cl. ..................................... 384/526; 384/573; 384/576
[58] Field of Search ............... 384/576, 572, 526, 573, 384/575

[56] References Cited

U.S. PATENT DOCUMENTS

| | | | |
|---|---|---|---|
| 2,550,911 | 5/1951 | Cobb | 384/526 |
| 2,712,481 | 7/1955 | Martin | 384/526 |
| 3,028,204 | 4/1962 | Schaeffler et al. | 384/576 |
| 3,938,866 | 2/1976 | Martin . | |
| 4,339,374 | 7/1982 | Olschewski et al. | 384/576 |

Primary Examiner—Lenard A. Footland

[57] ABSTRACT

The invention concerns a roller bearing equipped with rollers held between an inner and an outer race of the bearing and kept separate from one another by a bearing cage which is formed by an annular component consisting of one or more parts in which, along the circumference and at equal distances from one another, partially or fully enclosed openings have been formed which each contain a roller.

6 Claims, 1 Drawing Sheet

ROLLER BEARING

This application is a continuation of application Ser. No. 355,972, filed May 23, 1989, abandoned.

BACKGROUND OF THE INVENTION

The invention concerns a roller bearing equipped with rollers held between an inner and an outer race of the bearing and kept separate from one another by a bearing cage which is formed by an annular component consisting of one or more parts in which, along the circumference and at equal distances from one another, partially or fully enclosed openings have been formed within which each contains a roller.

A similar roller bearing is generally known, e.g., from the U.S. Pat. No. 3,938,866. In the known roller bearings the bearing cage—though it does not assume any of the bearing load—is of essential importance for keeping the rollers in the bearing separate from each other and at equal distances, so that there will not be any contact among them.

In the known roller bearings the bearing cage is usually made in a pressing process from metal plate such as sheet metal or sheet brass.

In the known roller bearings the friction between the rollers and the bearing cage constitutes a serious problem which may lead—especially at high speeds—to noise, excessive wear and tear and surface damage to the rollers.

The objective of the invention is to create a roller bearing of the kind mentioned above whereby the aforementioned disadvantages are avoided and whereby, in addition, the friction between the rollers and the bearing cage is reduced to a minimum.

SUMMARY OF THE INVENTION

The objective is achieved in accordance with the invention by coating the walls of the openings in the bearing cage entirely or partially with rubber.

On account of the porous properties of rubber, a lubricating film is generated between the bearing cage and the rollers which is 10 to 100 times thicker than in the known or synthetic bearing cage, leading to full hydrodynamic lubrication. In addition, the thickness of the lubricating film will be barely affected by locally higher contact pressures between the rollers and the bearing cage.

According to the invention it is also preferable for the size of the rubber-coated openings to be smaller than the size of the rollers to such an extent that the rubber coating around the mounted rollers will be elastically deformed.

As a result, there is no need for the manufacturing tolerances of the bearing cage material and of the rubber coating to be particularly accurate, because any deviation in size or any error in shape will be compensated by the elastic deformation of the rubber coating. Furthermore, the elasticity of the rubber coating makes it possible to mount the rollers with relatively little pressure through the narrower slots for insertion into the openings of the bearing cage, thus preventing damage to the rollers. Moreover, a similar roller bearing will run very quietly because there is no play between the rollers and the openings of the bearing cage, and also on account of the damping properties of the rubber coating.

It should be pointed out that it is generally known, among others from the American patent mentioned above, i.e., U.S. Pat. No. 3,938,866, that in bearing cages of the so-called snap type the openings through which the rollers are inserted into the bearing cage are slightly smaller than the rollers themselves. Consequently, the insertion of the rollers will occur under a certain pressure whereby the openings are elastically deformed and surface damage occurs to the rollers. In addition, the openings in the bearing cage which enclose the mounted rollers are designed to be larger than the rollers so that there will be a certain amount of play between the rollers and the openings and there will be no question of a certain pre-tension of the cage with regard to the rollers.

According to a further elaboration of the invention the thickness of the rubber coating is preferably 0.5 to 0.05 times the thickness of the bearing cage material. This thickness has proved sufficient for the absorption of major forces between the rollers and the bearing cage without damaging the rubber coating or causing it to tear away from the cage.

For heavy-duty industrial applications the rubber coating can be further reinforced with a mesh, fabric or strong fibers.

The invention is further explained with the help of the drawings in which two forms of execution of a roller bearing according to the invention are represented.

DETAILED DESCRIPTION OF INVENTION

Figure 1:
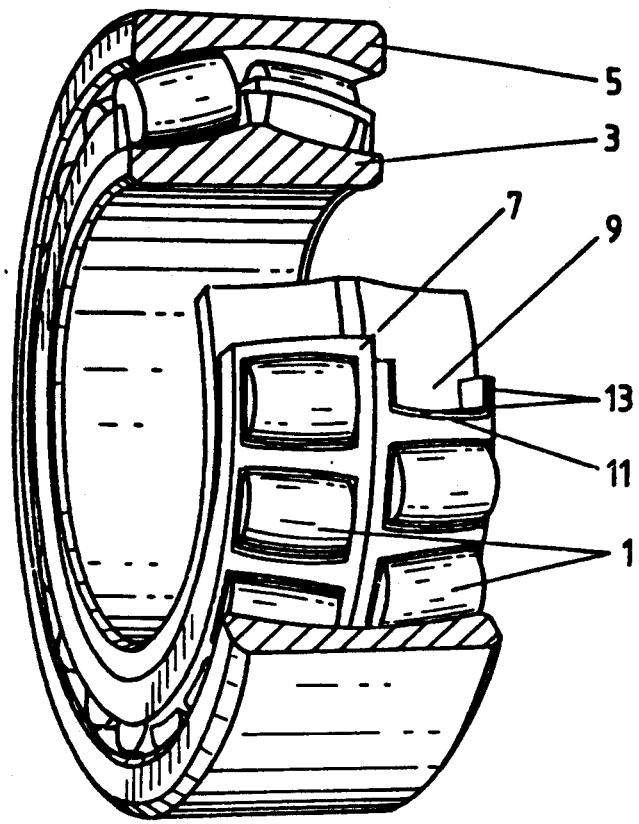
FIG. 1 shows a perspective view of the roller bearing according to the invention.

As shown in the figures, the roller bearings consists of a number of rollers 1, 2 which are held between an inner race 3, 4 and an outer race 5, 6 of the bearing and are kept separate from one another by a bearing cage 7, 8. The bearing cage consists of an annular component which is equipped, along its circumference and at equal distances from one another, with openings 9, 10, respectively, which enclose partially the rollers 1, 2. FIG. 1 shows a bearing cage 7 of the so-called window type which finds application, for example, in roller bearings.

In this case the openings 9 are rectangular.

Figure 2:
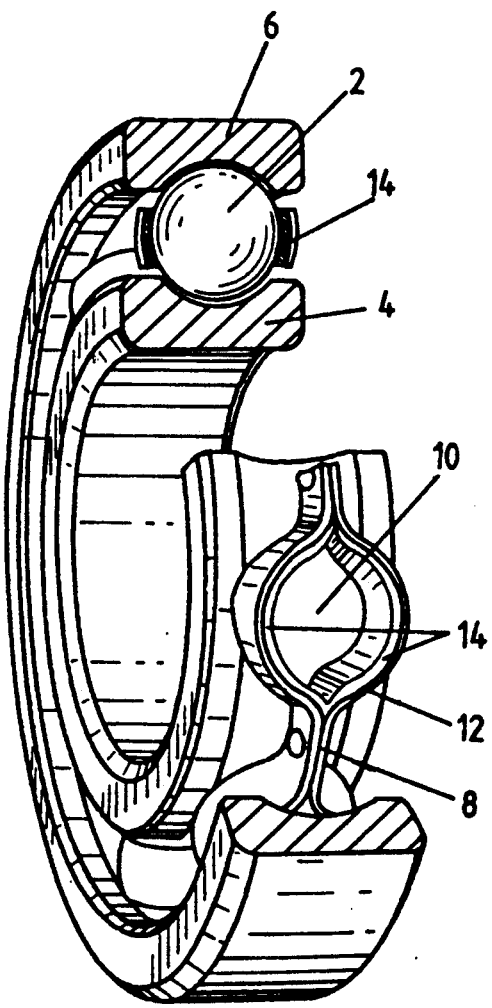
FIG. 2 shows a perspective view of another form of execution of a roller bearing.

The bearing cage 8 in FIG. 2 is equipped with round openings 10 which are common, for example, in ball bearings. In this case the bearing cage consists of two parts which are rivetted together.

The walls 11, 12 of, respectively, openings 9 and 10 are coated with a rubber coating 13, 14 respectively.

This coating can be reinforced with a mesh, fabric or strong fibers.

It will be obvious that the invention is not limited to the examples of execution described above which, within the scope of the invention, can undergo several variations.

I claim:

1. Roller bearing equipped with rollers held between an inner and an outer race of the bearing and kept separate from one another by a bearing cage which is formed by an annular component consisting of one or more parts in which, along the circumference and at equal distances from one another, partially or fully enclosed openings have been formed in which each contain a rolling bearing, characterized in that the walls of the openings are coated entirely or partially with a rubber coating and that the size of the rubber-coated openings is smaller than the size of the rollers to such a degree that the rubber coating around the mounted rollers is elastically deformed.

2. Roller bearing according to claim 1, characterized by the fact that the rubber coating (13, 14) is reinforced with a mesh, fabric or strong fibers.

3. Roller bearing according to claim 1, characterized by the fact that the thickness of the rubber coating is 0.5 to 0.05 times the thickness of the material of the bearing cage.

4. In a rolling bearing equipped with rolling elements held between an inner and an outer race of the bearing and kept separate from one another by a bearing cage which is formed by an annular component consisting of one or more parts in which, along the circumference and at equal distances from one another, partially or fully enclosed openings have been formed in which each contain a roller, and wherein a lubricating film is provided between the cage and the rolling elements, the improvement wherein the walls of the openings are coated entirely or partially with a porous rubber coating, whereby hydrodynamic lubrication of the bearing is produced.

5. The rolling bearing of claim 4 wherein the rubber coated openings of the cage have smaller sizes than the rolling elements, whereby the rubber coating is elastically deformed.

6. The rolling bearing of claim 4 wherein the rubber coating has a thickness from 0.05 to 0.5 times the thickness of the cage.

* * * * *